(12) United States Patent
Nemati et al.

(10) Patent No.: US 11,428,781 B2
(45) Date of Patent: Aug. 30, 2022

(54) SYSTEM AND METHOD FOR RADAR-BASED LOCALIZATION IN SPARSE ENVIRONMENT

(71) Applicant: Robert Bosch GmbH, Stuttgart (DE)

(72) Inventors: Alireza Nemati, Novi, MI (US); Aghapi Mordovanakis, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 492 days.

(21) Appl. No.: 16/668,127

(22) Filed: Oct. 30, 2019

(65) Prior Publication Data
US 2020/0142028 A1    May 7, 2020

Related U.S. Application Data

(60) Provisional application No. 62/754,330, filed on Nov. 1, 2018.

(51) Int. Cl.
*G01S 7/41* (2006.01)
*G05D 1/02* (2020.01)
(Continued)

(52) U.S. Cl.
CPC .............. *G01S 7/412* (2013.01); *G01S 13/89* (2013.01); *G01S 13/931* (2013.01);
(Continued)

(58) Field of Classification Search
CPC ........ G01S 7/042; G01S 13/86; G01S 13/867; G01S 13/89; G01S 13/931
See application file for complete search history.

(56) References Cited

U.S. PATENT DOCUMENTS 10,317,903 B2 * 6/2019 Shashua ............... B62D 15/025
10,386,480 B1 * 8/2019 Campbell ............. G01S 13/931
(Continued)

FOREIGN PATENT DOCUMENTS

WO    2015125022 A2    8/2015

*Primary Examiner* — Peter M Bythrow
(74) *Attorney, Agent, or Firm* — Kathy Takeguchi; Maginot, Moore & Beck LLP (57) ABSTRACT

A system and method for localization includes a processing system with at least one processing device. The processing system is configured to obtain sensor data from a sensor system. The sensor system includes at least one radar sensor. The processing system is configured to obtain map data. The processing system is configured to determine if there is a predetermined number of detected features. The detected features are associated with the sensor data of a current sensing region of the sensor system. The processing system is configured to generate localization data based on the detected features of the current sensing region upon determining that the predetermined number of detected features is satisfied. The processing system is configured to obtain tracked feature data upon determining that the predetermined number of detected features is not satisfied and generate localization data based on the tracked feature data and the detected features of the current sensing region. The tracked feature data includes detected features associated with the sensor data of a previous sensing region of the sensor system.

14 Claims, 6 Drawing Sheets

(51) Int. Cl.
*G01S 13/89* (2006.01)
*G01S 13/931* (2020.01)
*G01S 13/86* (2006.01)
*G05D 1/00* (2006.01)

(52) U.S. Cl.
CPC .......... *G05D 1/0257* (2013.01); *G01S 13/867* (2013.01); *G01S 2013/9316* (2020.01); *G05D 1/0088* (2013.01); *G05D 2201/0213* (2013.01)

(56) References Cited

U.S. PATENT DOCUMENTS

| | | | | |
|---|---|---|---|---|
| 11,269,347 | B2* | 3/2022 | Wiacker | G05D 1/0276 |
| 2010/0066587 | A1* | 3/2010 | Yamauchi | G01S 13/931 |
| | | | | 342/54 |
| 2012/0221168 | A1* | 8/2012 | Zeng | B60W 30/16 |
| | | | | 701/1 |
| 2014/0358322 | A1* | 12/2014 | Ibrahim | G05D 1/0055 |
| | | | | 701/1 |
| 2016/0046290 | A1* | 2/2016 | Aharony | B60W 30/0953 |
| | | | | 701/41 |
| 2016/0139255 | A1* | 5/2016 | Bueschenfeld | G01S 7/411 |
| | | | | 342/146 |
| 2016/0161265 | A1* | 6/2016 | Bagheri | G01C 21/3811 |
| | | | | 701/450 |
| 2016/0231746 | A1* | 8/2016 | Hazelton | G05D 1/0274 |
| 2017/0075355 | A1* | 3/2017 | Micks | G01S 19/45 |
| 2017/0248960 | A1* | 8/2017 | Shashua | G05D 1/0088 |
| 2017/0307746 | A1* | 10/2017 | Rohani | G01S 7/412 |
| 2018/0038694 | A1* | 2/2018 | Bruemmer | G01C 21/005 |
| 2018/0066954 | A1* | 3/2018 | Oder | G05D 1/021 |
| 2018/0224283 | A1* | 8/2018 | Fasola | G05D 1/0274 |
| 2019/0025854 | A1* | 1/2019 | Rohani | G01C 21/00 |
| 2019/0129431 | A1* | 5/2019 | Yalla | G06V 20/56 |
| 2019/0145784 | A1* | 5/2019 | Ma | G06F 16/29 |
| | | | | 701/448 |
| 2019/0293772 | A1* | 9/2019 | Pfeiffer | G05D 1/024 |
| 2019/0376797 | A1* | 12/2019 | Walls | G01C 21/3602 |
| 2020/0025575 | A1* | 1/2020 | Weissman | G01S 17/06 |
| 2020/0111011 | A1* | 4/2020 | Viswanathan | G01C 21/005 |
| 2020/0142026 | A1* | 5/2020 | Bush | G01S 13/931 |

* cited by examiner

SYSTEM AND METHOD FOR RADAR-BASED LOCALIZATION IN SPARSE ENVIRONMENT

CROSS-REFERENCE TO RELATED APPLICATION

This application claims the benefit of U.S. Provisional Patent Application No. 62/754,330, which was filed on Nov. 1, 2018, and which is hereby incorporated herein by reference in its entirety.

FIELD OF THE INVENTION

This disclosure relates generally to localization, and more specifically to localization with at least one radar system.

BACKGROUND

In general, some vehicles may include on-board sensors to provide localization data. In this regard, for example, the on-board sensors often include a global positioning system (GPS) sensor and a camera system. However, the GPS sensor does not provide a high level of accuracy with respect to localization in some instances. In addition, the camera system may not provide sufficient or accurate data for localization in various situations and conditions, such as in fog, snow, sandstorms, spraying conditions, wet asphalt, leaf-coverage, direct sunlight, etc. Accordingly, with these on-board sensors, the localization data for these vehicles may not be suitable for applications such as highly automated driving and autonomous driving.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a system includes a sensor system, a non-transitory computer readable medium, and an electronic processor. The sensor system includes a plurality of sensors. The plurality of sensors include at least a radar sensor. The non-transitory computer readable medium stores at least map data. The electronic processor communicates with the sensor system and the computer readable medium. The electronic processor is operable to obtain first sensor data of a first sensing region from the sensor system. The first sensor data includes at least first radar data. The electronic processor is operable to generate first feature data based on the first sensor data of the first sensing region. The electronic processor is operable to determine that the first feature data does not meet threshold criteria upon correlating the first feature data with map features of the map data. The electronic processor is operable to obtain second feature data based on second sensor data of a second sensing region. The second sensor data includes second radar data. The electronic processor is operable to generate localization data based at least on the first feature data and the second feature data.

According to at least one aspect, a computer-implemented method includes obtaining first sensor data of a first sensing region from the sensor system. The first sensor data includes at least first radar data. First feature data is generated based on the first sensor data of the first sensing region. The method includes determining that the first feature data does not meet threshold criteria upon correlating the first feature data with map features of the geographic region. The method includes obtaining second feature data based on second sensor data of a second sensing region. The second sensor data includes at least second radar data. The method includes generating localization data based at least on the first feature data and the second feature data.

These and other features, aspects, and advantages of the present invention are further clarified by the following detailed description of certain exemplary embodiments in view of the accompanying drawings throughout which like characters represent like parts.

DETAILED DESCRIPTION

The embodiments described above, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
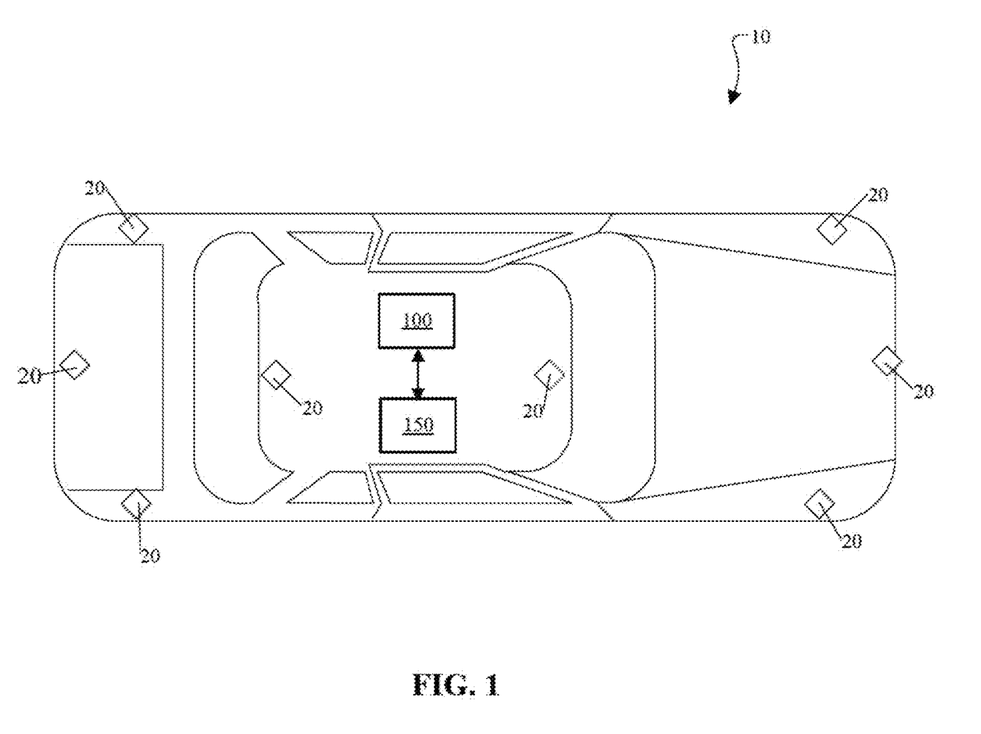
FIG. 1 is a diagram of a non-limiting example of a vehicle with a localization system according to an example embodiment of this disclosure.

FIG. 1 is a diagram of a vehicle 10 with a system 100 for localization according to an example embodiment. In an example embodiment, the vehicle 10 is a mobile machine, which is configured to be driven autonomously, semi-autonomously, non-autonomously, or any combination thereof. In an example embodiment, the system 100 includes hardware technology, software technology, or any combination of hardware and software technology. In an example embodiment, the system 100 is advantageous in enabling the vehicle 10 to determine a location and orientation of the vehicle 10. Moreover, the system 100 is configured to provide this localization data with high accuracy in real-time. Also, the system 100 is configured to communicate with at least one other system 150 so that the localization data is used in route planning, navigation, or any suitable application associated with an operation of the vehicle 10.

Figure 2:
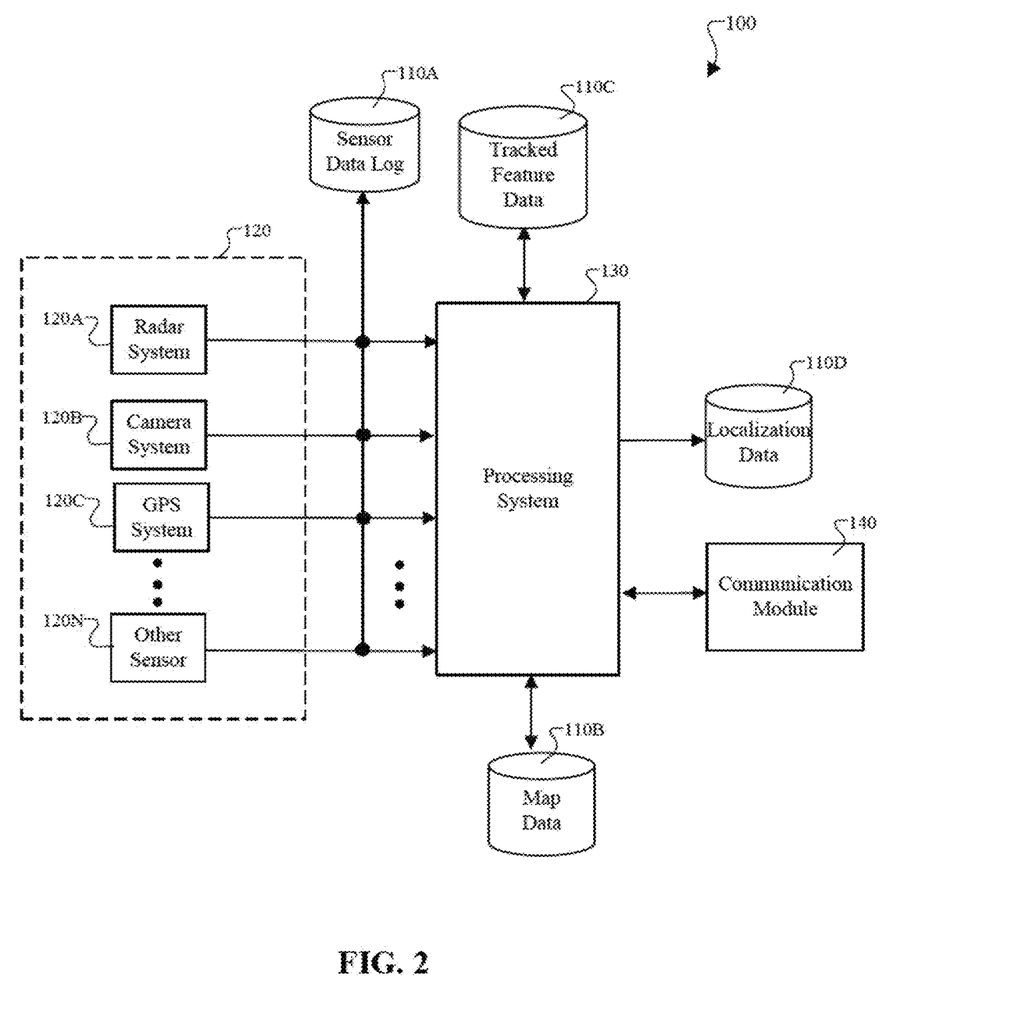
FIG. 2 is a block diagram of an example of a localization system according to an example embodiment of this disclosure.

In an example embodiment, the system 100 includes a sensor system 120 (FIG. 2) with one or more sensors 20 at any suitable location of the vehicle 10 such that the sensor system 120 is enabled to provide proper sensor data to the processing system 130. In this regard, for example, FIG. 1 merely illustrates a conceptual diagram that shows various sensors 20, which are placed at various locations to sense an environment of the vehicle 10. In an example embodiment, the one or more sensors 20 are configured to capture data relating to the vehicle 10, the environment of the vehicle 10, the location of the vehicle 10, the orientation of the vehicle 10, other relevant information, or any combination thereof. In an example embodiment, upon capturing the data, the one or more sensors 20 are configured to provide the captured data to the appropriate sensor system for processing. For instance, as shown in FIG. 1, the vehicle 10 includes a plurality of sensors 20, which are configured to be processed by the appropriate sensor system. Moreover, as shown in FIG. 2, for example, the sensor system 120 includes a radar system 120A, an image based system (e.g. camera system) 120B, a satellite based system (e.g., global positioning system (GPS), Galileo, or the like) 120C, any suitable sensor system 120N, or any combination thereof. As non-limiting examples, for instance, the sensor system 120N may include a light detection and ranging (LIDAR) system, an odometer system, a sonar system, an inertial measurement unit (IMU), an ultrasonic sensor system, an infrared sensor, any suitable sensing device, or any combination thereof.

In an example embodiment, the system 100 includes communication and/or network technology, which enables at least each of the components to communicate with each other, as shown in FIG. 2. In an example embodiment, for instance, the vehicle 10 and/or the system 100 includes control area network (CAN) technology, wired communication technology, wireless communication technology, any suitable networking technology, or any combination thereof to enable the components to communicate with each other. Also, in an example embodiment, the vehicle 10 and/or system 100 includes communication module 140, which enables the vehicle 10 and/or system 100 to communicate with at least one other communication technology (e.g., network communication technology, vehicle-to-infrastructure communication, vehicle-to-vehicle communication, cloud technology, etc.) to provide one or more functions described herein. In an example embodiment, the communication module 140 includes the appropriate hardware components, software components, or both hardware and software components that is compatible with the communication technology. In an example embodiment, the system 100 and its components are local to the vehicle 10. However, in an alternative embodiment, the system 100 can include one or more components, which are remote to the vehicle 10 but are also communicatively connected one or more components that are local to the vehicle 10. Additionally or alternatively, the system 100 can include one or more other components, which are not specifically mentioned herein, provided that the system 100 is configured to provide the functions described herein.

In an example embodiment, as shown in FIG. 1, the system 100 is advantageously applied to the vehicle 10. However, the system 100 is not limited to vehicular applications, but is also applicable to various other applications. For example, the system 100 is applicable to any mobile device or mobile machine. In this regard, for instance, the system 100 is beneficial to any system that relies on location data, orientation data, and/or localization data. The system 100 is configured to provide this localization data with high accuracy in various environments and conditions, thereby being advantageous in various applications.

FIG. 2 is a diagram of the system 100 according to an example embodiment. In an example embodiment, the system 100 includes the sensor system 120, the processing system 130, the communication module 140, and at least one computer readable medium 110. In an example embodiment, the sensor system 120 includes a radar system 120A, an image based system (e.g. camera system) 120B, a satellite based system (e.g., global positioning system (GPS), Galileo, or the like) 120C, any suitable sensor system 120N, or any combination thereof. More specifically, the radar system includes at least one radar sensor, which is configured to detect various objects in an environment. Each radar sensor is advantageous in being able to detect objects in various conditions and environments, such as in fog, snow, sandstorms, spraying conditions, wet asphalt, leaves covering parts of roads, direct sunlight, etc. In this regard, for instance, the radar system 120A is configured to provide sensor data upon detecting various objects (e.g., posts, barriers, bridges, any other radar detectable entity, etc.) within its detecting region/range 12A (e.g., as shown in the non-limiting example of FIG. 3). In an example embodiment, the sensor system 120 includes a camera system 120B with at least one camera. In an example embodiment, the camera system 120B is configured to provide sensor data upon detecting various objects (e.g., lane markings, traffic signs, etc.) within its detecting region/range 12B (e.g., as shown in the non-limiting example of FIG. 3). In an example embodiment, the GPS system 120C is configured to provide sensor data upon receiving and/or processing signals via the satellites. In addition, the sensor system 120 is configured to include other sensor systems, as discussed with respect to FIG. 1. Upon receiving the sensor data, the system 100 is configured to store the sensor data in computer readable medium II OA, which is accessible via the processing system 130.

In an example embodiment, the processing system 130 includes one or more processing devices or processors. The one or more processors include an electrical processor, an electronic processor, a computer processor, or various combinations thereof. In an example embodiment, the processing system 130 is configured to at least obtain sensor data from the sensor system 120. In an example embodiment, the processing system 130 is configured to obtain sensor data from computer readable medium 110A. In addition, the processing system 130 is configured to obtain map data from computer readable medium 110B. The processing system 130 is configured to process the sensor data and the map data to generate localization data, as discussed herein. In an example embodiment, the processing system 130 is configured to store the localization data in computer readable medium 110D for use by any suitable application and/or system. Also, in an example embodiment, the processing system 130 is configured to provide any proper requests from another appropriate entity (e.g., remote server in the cloud based system 310, another in-network vehicle 10, etc.) for sensor data, map data, tracked feature data, localization data, any relevant data, or any combination thereof via communication module 140.

In an example embodiment, the computer readable medium/media 110 (e.g. computer readable medium 110A, 110B, 110C, and/or 110D) includes one or more electrical, electronic, or computer hardware storage devices, or any combination thereof. Non-limiting examples of a computer readable medium 110 includes any suitable storage device, memory circuits, random access memory (RAM), read only memory (ROM), any computer disk, any type of memory hardware, or any combination thereof. In an example embodiment, the computer readable medium is a non-transitory storage device. In FIG. 2, for instance, the processing system 130 is communicatively connected to computer readable medium 110A, computer readable medium 110B, and computer readable medium 110C, computer readable medium 110D. In an example embodiment, the computer readable medium 110A, the computer readable medium 110B, the computer readable medium 110C, and the computer readable medium 110D are distinct computer memory entities or different memory portions of the same computer memory entity.

Figure 3:
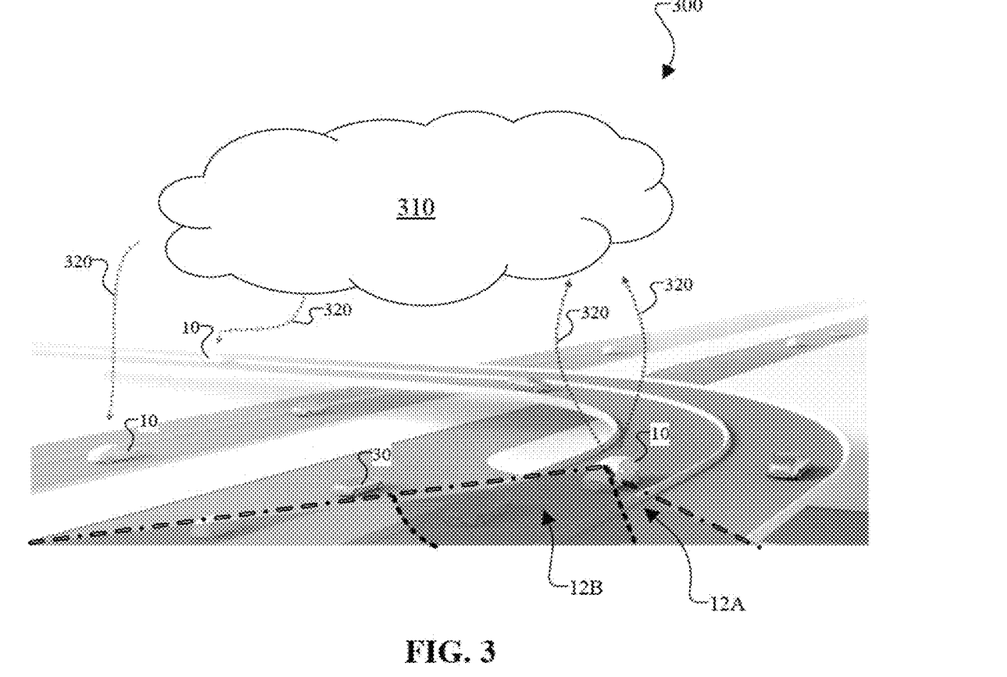
FIG. 3 is a conceptual diagram of an example of a network for localization according to an example embodiment of this disclosure.

FIG. 3 is a conceptual diagram of an example of a network system 300 for localization according to an example embodiment. In an example embodiment, the network system 300 includes a plurality of localization systems 100. For instance, FIG. 3 illustrates an example in which a plurality of in-network vehicles 10 at different locations are enabled to communicate with each other (and/or with other relevant systems relating to localization) via cloud-based technology 310 and/or vehicle-to-vehicle communication technology. The network system 300 provides these communication privileges to only in-network vehicles 10 (e.g., via communication module 140) and not to other vehicles 30 (such as out-of-network vehicles). In an example embodiment, the cloud based technology 310 includes one or more cloud based systems and/or cloud-based services. In an example embodiment, the cloud-based technology includes one or more remote servers, which are configured to communicate with each localization system 100 via suitable communication technology 320 (e.g., wireless communication technology). As demonstrated above, with this network system 300, each localization system 100 is enhanced and strengthened by sharing relevant data, such as sensor data and/or localization data. In this regard, for instance, if one particular vehicle 10 of the network system 300 is enabled to provide more and/or better detected features for a specific region than another vehicle 10 due to sensor malfunction and/or better sensing position (or any other reason), then that particular vehicle 10 is configured to provide this information for the specific region to that another vehicle 10. This feature is advantageous in ensuring that each system 100 is provided with reliable and highly accurate localization data in various scenarios.

Figure 4:
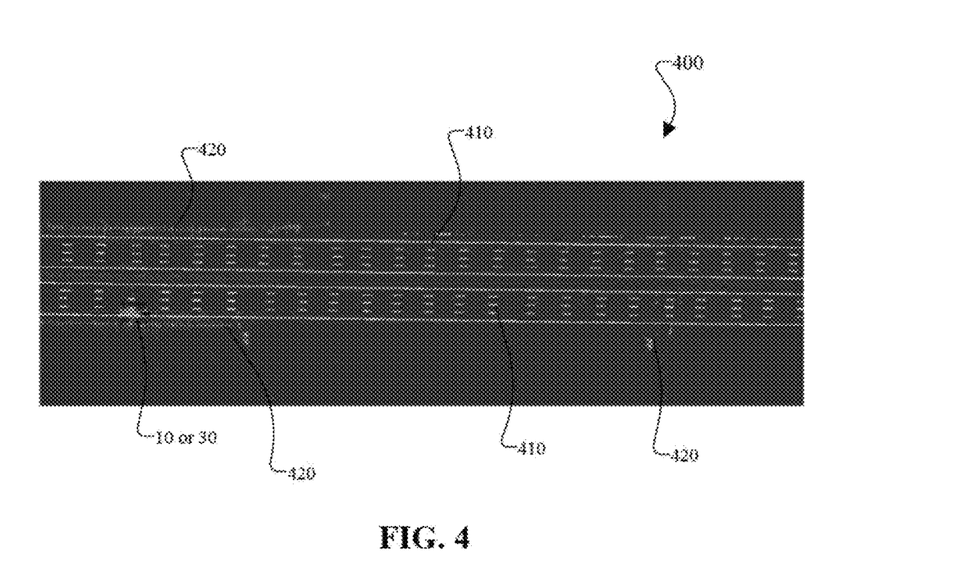
FIG. 4 is a non-limiting example of sensor data that includes radar data according to an example embodiment of this disclosure.

FIG. 4 is a non-limiting example of a representation that includes radar data. More specifically, FIG. 4 illustrates an example of a layer, which includes camera detected features 410 (e.g. lane markings via camera system 120B) together with a radar road signature and/or a radar layer that includes radar detected features 420 (e.g., guide rails and barriers via radar system 120A). As discussed herein, the processing system 130 is configured to obtain this sensor data and/or generate these sensor layers. In addition, with this representation and/or sensor layers that includes detected features, the processing system 130 is configured to generate and/or fine-tune localization data with high accuracy in accordance with map data.

Figure 5A:
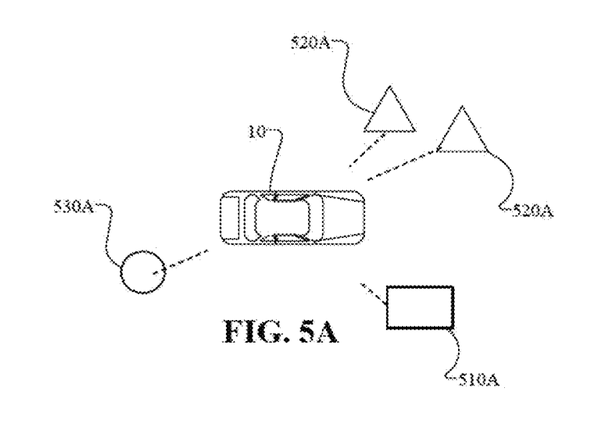
FIG. 5A is a conceptual diagram of an example of the vehicle of FIG. 1 in association with detected features according to an example embodiment of this disclosure.
Figure 5B:
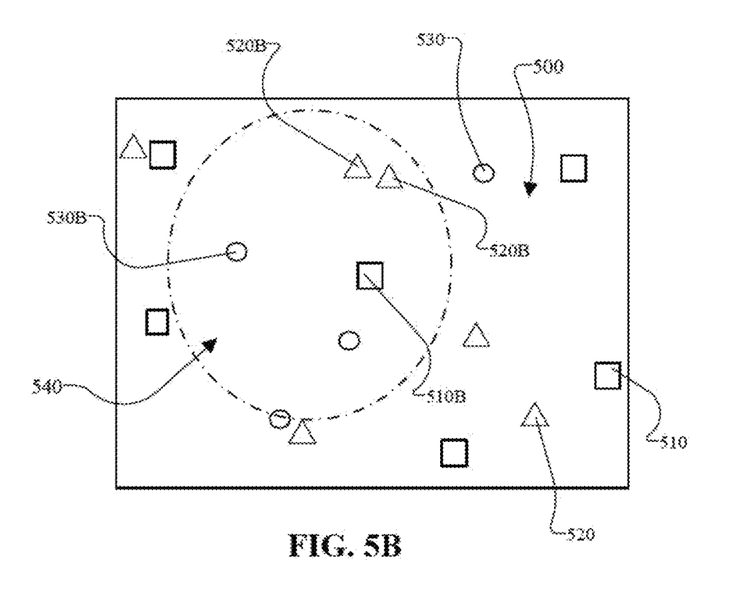
FIG. 5B is a conceptual diagram that illustrates GPS data of the vehicle of FIG. 5A in relation features of a map according to an example embodiment of this disclosure.
Figure 5C:
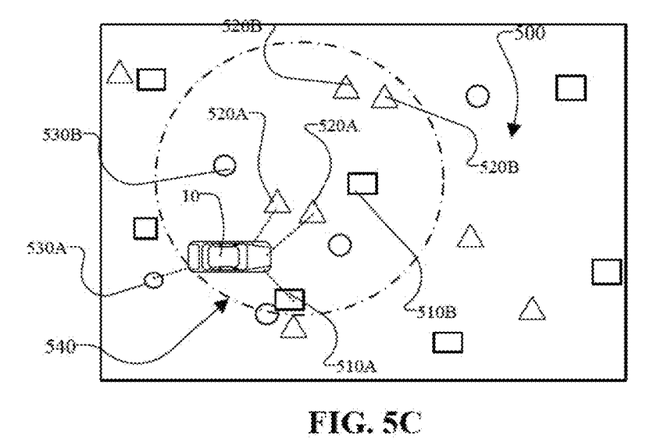
FIG. 5C is a conceptual diagram that illustrates the process of correlating the detected features of the vehicle of FIG. 5A with respect to features of the map of FIG. 5B according to an example embodiment of this disclosure.
Figure 5D:
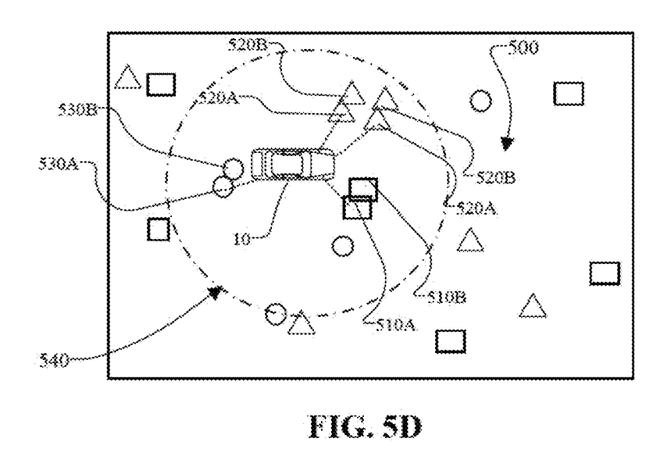
FIG. 5D is a conceptual diagram that illustrates the process of correlating the detected features of the vehicle of FIG. 5A with respect to features of the map of FIG. 5B according to an example embodiment of this disclosure.
Figure 5E:
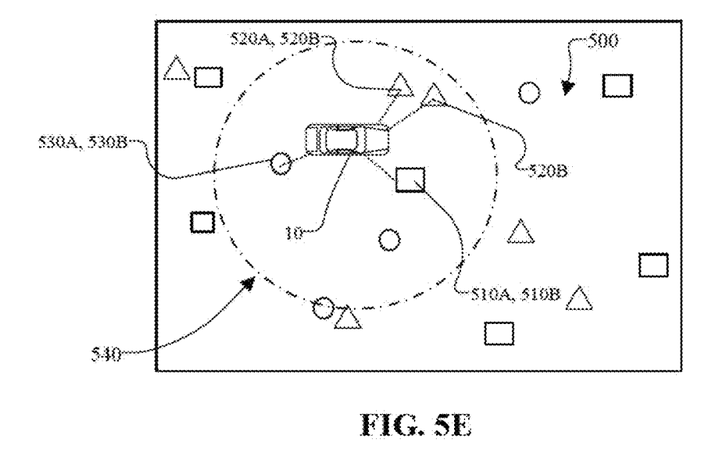
FIG. 5E is a conceptual diagram that illustrates a matching of the detected features of the vehicle of FIG. 5A with respect to features of the map of FIG. 5B according to an example embodiment of this disclosure.

FIGS. 5A-5E are conceptual diagrams that illustrate a process of determining a location of the vehicle 10 by correlating detected features of sensor data from sensor system 120 with map features from map data stored on computer readable medium 110B. More specifically, FIG. 5A illustrates the vehicle 10 along with various features, which are detected by the sensor system 120. For example, the detected features include features 510A (e.g., posts, guide rails, etc.), as detected by the radar system 120A. The detected features include features 520A (e.g., lane-markings, etc.), as detected by the camera system 120B. Also, the detected features include other features 530A (e.g., other obstacles, vehicles, etc.), as detected by another sensor system 120N. Meanwhile, FIG. 5B illustrates a GPS range 540 of a region 500 (e.g. roadway) in which a presence of the vehicle 10 (not shown in FIG. 5B) is detected. Moreover, FIGS. 5C-5D illustrate the process of determining localization data of the vehicle 10 with high accuracy by correlating and/or matching the detected features (e.g., 510A, 520A, and 530A), as obtained via the sensor system 120, with map features (e.g., 510B, 520B, and 530B) from map data stored on computer readable medium 110B. In this regard, as shown, in FIGS. 5C and 5D, the processing system 130 is configured to determine that the vehicle 10 is not located at these positions at least since the detected features (e.g., 510A, 520A, and 530A) do not possess a high correlation with the map features (e.g., 510B, 520B, and 530B) at specified thresholds (or predetermined tolerances) and/or does not align or match up with these map features (e.g., 510B, 520B, and 530B). In contrast, in FIG. 5E, the processing system 130 is configured to determine that the vehicle 10 is located at this position and orientation. More specifically, the processing system 130 is configured to generate and compute localization data based on information provided by these detected features (e.g., 510A, 520A, and 530A) upon determining that the detected features (e.g., 510A, 520A, and 530A) exhibit a high correlation with the map features (e.g., 510B, 520B, and 530B) in accordance with specified thresholds (or predetermined tolerances). In FIG. 5E, the detected features (e.g., 510A, 520A, and 530A) align with and/or match up with the map features (e.g., 510B, 520B, and 530B).

Figure 6A:
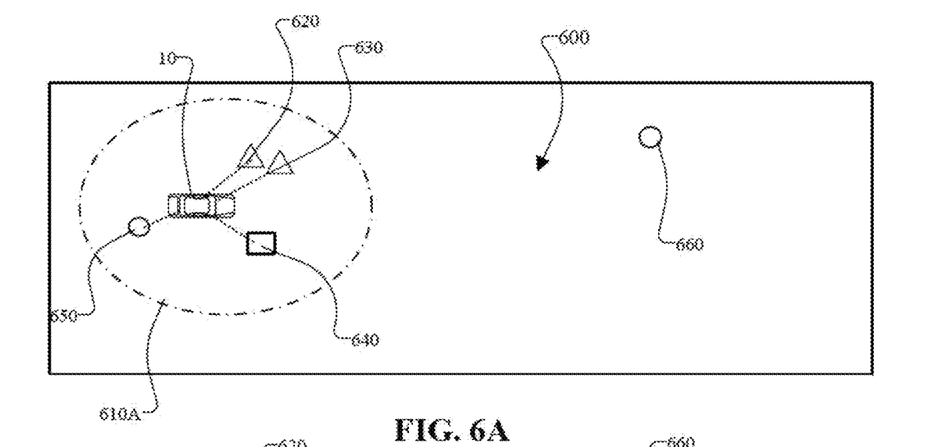
FIG. 6A is a conceptual diagram of a sensor range of the vehicle of FIG. 1 in association with objects in an environment according to an example embodiment of this disclosure.
Figure 6B:
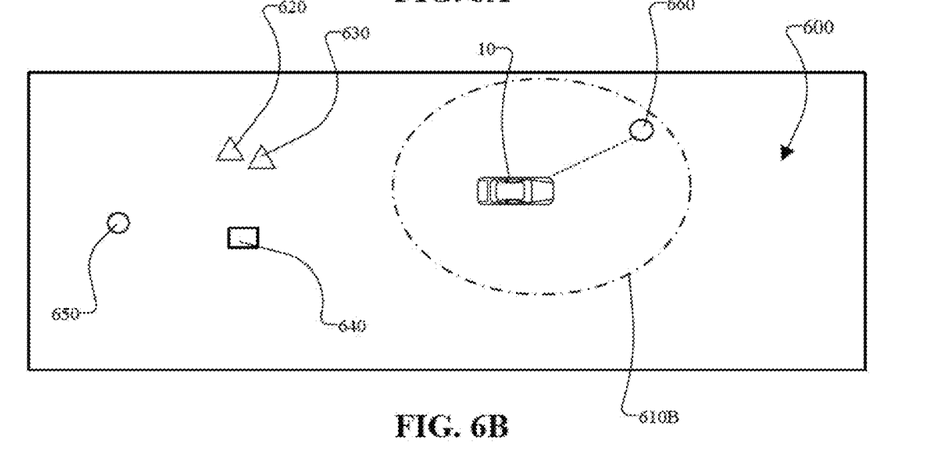
FIG. 6B is a conceptual diagram of a sensor range of the vehicle of FIG. 1 in association with a sparse environment according to an example embodiment of this disclosure.
Figure 6C:
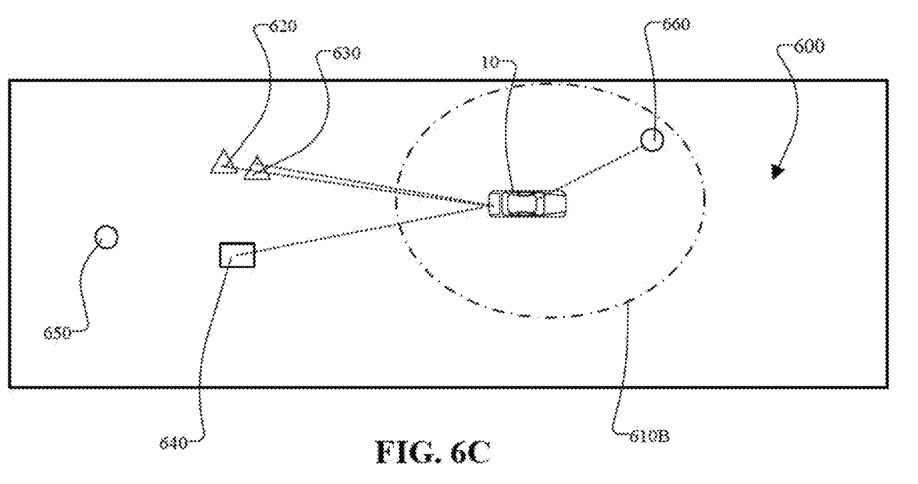
FIG. 6C is a conceptual diagram of a sensor range of the vehicle of FIG. 1 in association with a sparse environment in which localization data is generated according to an example embodiment of this disclosure.

FIGS. 6A-6C are conceptual diagrams that illustrate a sensor range 610 associated with the sensor system 120 of the vehicle 10 in different environments. More specifically, FIG. 6A illustrates a sensing region 610A when the vehicle 10 is "a non-sparse environment" of a roadway 600. As shown in this non-limiting example, the system 100 is configured to detect a predetermined number of features in the environment via its sensor system 120. In an example embodiment, the predetermined number of features represent sufficient data, which enables the processing system 130 to compute localization data with high accuracy. With this sensor data, the processing system 130 is configured to generate localization data for the vehicle 10 by correlating the detected features (e.g., feature 620, feature 630, feature 640, feature 650, etc.) with map features of the map data in a similar manner as that discussed with respect to FIGS. 5A-5E. As a non-limiting example, in FIGS. 6A-6C, the detected features include features 620 and 630 (e.g. lane markings), which are detected by the camera system 120B. In addition, the detected features include feature 640 (e.g., post, barrier, etc.), which is detected by the radar system 120A, and feature 650, which is detected by another sensor system 120N. In contrast, FIG. 6B illustrates "a sparse environment" in which the predetermined number of features are not available and/or not detectable via the sensor system 130 such that the processing system 130 is not enabled to generate localization data with high accuracy based thereupon. As shown in FIG. 6B, for instance, there is only one detected feature 660, which is within the sensing region 610B of the vehicle 10 and detected by at least one sensor (e.g., radar sensor) of the sensor system 120. That is, with this sensor data alone, the system 100 does not have sufficient information to be able to generate localization data with high accuracy. On the other hand, FIG. 6C highlights an advantageous feature of the system 100. More specifically, as shown in FIG. 6C, for instance, when the system 100 determines that sensing region 610B does not provide adequate information to generate localization data with high accuracy, then the system 100 is configured to obtain tracked feature data from computer readable medium 110C, as many times as deemed appropriate to generate localization data with high accuracy. Additionally or alternatively, the system 100 is configured to obtain previous sensor data from computer readable medium 110A. For instance, in this case, the system 100 is configured to obtain tracked feature data from computer readable medium 110C. In this example, for instance, the tracked feature data includes previously detected features (e.g., feature 620, feature 630, feature 640, etc.), which were obtained in association with the previous sensing region 610A. With the previously detected features (e.g., feature 620, feature 630, and feature 640) that are outside of the current sensing region 610B and with the currently detected feature (e.g. feature 660) that is within the current sensing region 610B, the system 100 is configured to generate localization data with high accuracy based on this information.

As described herein, the system 100 provides a number of advantageous features, as well as benefits. For example, the system 100 is configured to provide localization data with high accuracy in real-time. In addition, the system 100 is configured to provide localization with a suitable number of high-quality features, as detected at least by the sensor system 120. Also, the system 100 is configured to encode these features with additional information, such as radar cross-section, object-type, measurement quality, any relevant data, or any combination thereof.

Also, in an example embodiment, the system 100 is configured to generate at least a radar road signature and/or a radar layer for high definition automated driving maps with high accuracy. More specifically, the system 100 is configured to generate one or more radar layers even in situations in which there are not a significant number of detectable features (e.g., markers, stationary objects, fixed objects, or the like), which are detected by the vehicle 10 at a given time, thereby making the system 100 and/or its localization feature more robust and extending its applicability to environments that are sparse in radar-visible markers.

In addition, the system 100 is configured to average multiple radar measurements of a single object from multiple ego-vehicle positions, thereby being effective in reducing measurement sensitivity to object distance, object angle, radar specifications (e.g., long range, corner, angular sensitivity, etc.), or any combination thereof. With this averaging feature, the system 100 is configured to perform the correlation/matching process with less sensitivity to a sensor configuration of the sensors 20 of the sensor system 120. Furthermore, the system 100 is advantageously configured to provide radar-based localization, which is enhanced with a robust memory-persistent stationary world representation and which provides reliable sensor data in various conditions (e.g, fog, snow, etc.).

Furthermore, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A system comprising:
    a sensor system including a plurality of sensors, the plurality of sensors include at least a radar sensor;
    a non-transitory computer readable medium that stores at least map data;
    an electronic processor that communicates with the sensor system and the non-transitory computer readable medium, the electronic processor being operable to:
        obtain first sensor data of a first sensing region from the sensor system, the first sensor data including at least first radar data;
        generate first feature data based on the first sensor data of the first sensing region;
        determine that the first feature data does not meet threshold criteria upon correlating the first feature data with map features of the map data;
        obtain second feature data based on second sensor data of a second sensing region, the second feature data including detected features that are outside of the first sensing region; and
        generate localization data based at least on the first feature data and the second feature data.

2. The system of claim 1, wherein:
    the first sensing region is a current sensing region corresponding to detection ranges of the plurality of sensors at a first time period; and the second sensing region is a previous sensing region corresponding to the detection ranges of the plurality of sensors at a second time period.

3. The system of claim 1, wherein:
the first sensing region is based on a first location;
the second sensing region is based on a second location; and
the first location is different than second location.

4. The system of claim 1, wherein the electronic processor is further operable to:
determine that the combination of the first feature data and the second feature data meets threshold criteria upon correlating the first feature data and the second feature data with map features of the map data.

5. The system of claim 1, wherein:
the sensor system includes an image sensor;
the electronic processor generates a representation of the first sensing region that includes (i) a first layer with first features detected from the radar sensor, and (ii) a second layer with second detected features from the image sensor; and
the first feature data includes at least the first detected features and the second detected features.

6. The system of claim 1, wherein:
the electronic processor obtains the second feature data from the non-transitory readable medium as the second feature data is generated prior to the first feature data.

7. The system of claim 1, further comprising:
a communication system that is operable to receive supplemental sensor data from another vehicle that has communication privileges of a communication network; and
the electronic processor is operable to generate supplemental feature data from the supplemental sensor data,
wherein the localization data is generated based on the first feature data, the second feature data, and the supplemental feature data.

8. A computer-implemented method comprising
obtaining first sensor data of a first sensing region from a sensor system having a plurality of sensors including at least a radar sensor, the first sensor data including at least first radar data;
generating first feature data based on the first sensor data of the first sensing region;
determining that the first feature data does not meet threshold criteria upon correlating the first feature data with map features of map data;
obtaining second feature data based on second sensor data of a second sensing region, the second sensor data including at least second radar data; and
generating localization data based at least on the first feature data and the second feature data.

9. The method of claim 8, wherein:
the first sensing region is a current sensing region corresponding to first detections that are captured by the sensor system at a first time period; and
the second sensing region is a previous sensing region corresponding to second detections that are captured by the sensor system at a second time period.

10. The method of claim 8, wherein:
the first sensing region is based on a first location;
the second sensing region is based on a second location; and
the first location is different than second location.

11. The method of claim 8, further comprising:
determining that the combination of the first feature data and the second feature data meets threshold criteria upon correlating the first feature data and the second feature data with map features of the map data.

12. The method of claim 8, further comprising:
determining that the combination of the first feature data and the second feature data does not meet threshold criteria upon correlating the first feature data and the second feature data with map features of the map data; and
obtaining third feature data based on third sensor data of a third sensing region, the third sensing region including at least a section that is not included in the first sensing region and the second sensing region,
wherein the localization data is generated based on the first feature data, the second feature data, and the third feature data.

13. The method of claim 8, further comprising:
generating a representation of the first sensing region that includes (i) a first layer with first features detected from the radar sensor, and (ii) a second layer with second detected features from an image sensor,
wherein the first feature data includes at least the first detected features and the second detected features.

14. The method of claim 8, further comprising:
receiving supplemental sensor data from another vehicle that has communication privileges of a communication network; and
generating supplemental feature data from the supplemental sensor data,
wherein the localization data is generated based on the first feature data, the second feature data, and the supplemental feature data.

* * * * *